Jan. 20, 1970  J. B. PICCHIOTTINO  3,491,216
HUM-BUCKING COUPLING DEVICE
Filed Sept. 15, 1966
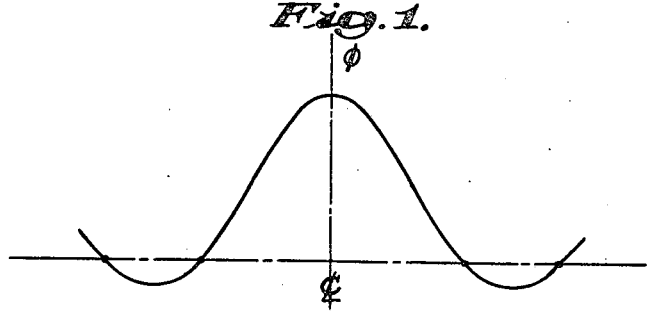
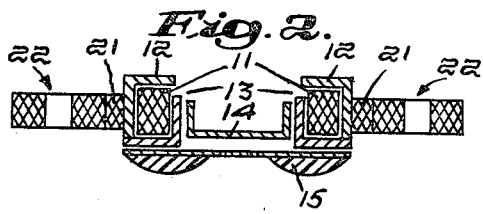
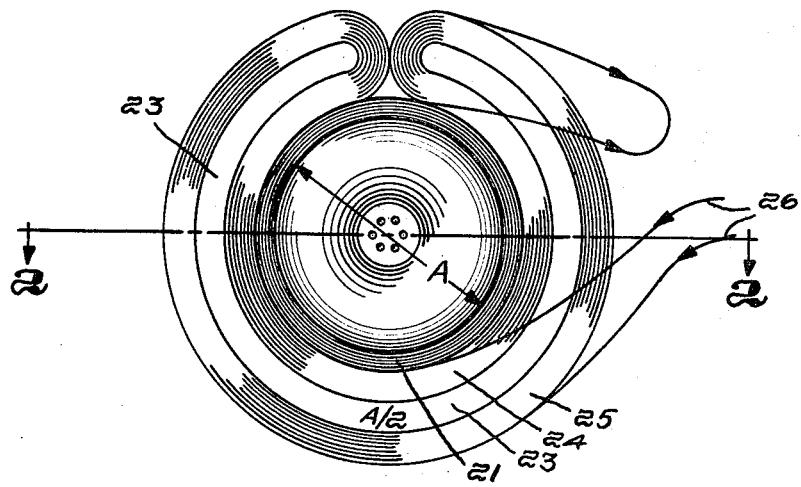
Inventor:
John B. Picchiottino,
by Russell, Chittick & Pfund
Attorneys

United States Patent Office 3,491,216
Patented Jan. 20, 1970

3,491,216
HUM-BUCKING COUPLING DEVICE
John B. Picchiottino, Boulder, Colo., assignor, by mesne assignments, to Phonocopy, Inc., Wilmington, Del., a corporation of Delaware
Filed Sept. 15, 1966, Ser. No. 579,589
Int. Cl. H04m 1/74
U.S. Cl. 179—174                                                         5 Claims

ABSTRACT OF THE DISCLOSURE

A hum-bucking induction coupling device for a telephone instrument or the like has a first coupling coil surrounding the instrument's signal coil and a second, C-shaped coupling coil surrounding and co-planar with the first coupling coil. The two coils are connected in opposition and preferably have equal turn-effective area products so that the EMF's induced in the coils by a unidirectional flux will cancel each other. The effective area of the second coil preferably corresponds to the region of the return signal flux path so that the EMF induced in the second coil is additive to the signal produced by the direct signal flux.

---

This invention relates generally to induction coupling devices and more particularly to an induction coupling coil structure which minimizes hum pick-up.

Conventional hum-bucking coupling coils generally provide two or more coils in side-by-side relation with connections to the output terminals that produce cancellation for flux fields which the turns of both cells. While these prior art devices provide some improvement in hum cancellation, they generally do not compensate for localized field variations where in a portion of the structure is located in a stronger field than the remainder of the device.

The present invention provides an arrangement of two coils with the turns and the area enclosed by the turns so distributed that the device is capable of substantial cancellation for non-uniform field environments particularly if the hum producing field couples a sector of the device since for flux perpendicular to the plane of the coil, the sectors of both coils contain an area and number of turns which make the flux linkages approximately equal for both coils. Hence the connection of the coils to produce opposition signals at the terminals for EMF's induced by unidirectional fields results in substantial cancellation for such stray fields.

The present invention is also particularly adapted for coupling to a telephone earpiece and specifically as disclosed for coupling to the U1 earpiece currently in widespread use with the telephones of the Bell system. This signal coil of the U1 earpiece has a flux distribution which varies from a large value on the axis of the coil, down to zero at approximately the periphery of the coil and a reverse flux component in the region immediately adjacent the outer periphery of the signal coil. In accordance with the present invention, this region of reversed flux is selected as the area enclosed by the turns of the hum-bucking coil thus making the signals induced in the hum-bucking coil by this reversed flux actually additive with the signals produced in the main pick-up coupling coil to enhance the ability of the device in coupling the desired signals from the U1 earpiece coil. At the same time, this physical configuration gives the desired ability of coupling substantially the same number of flux linkages in both coils when only a portion of the device is linked with a hum field. Thus when the device is in use on a telephone earpiece and placed adjacent some source of hum, such as a 60 cycle motor or other inductive device, the hum field will link a given sector of the coupling device and since for such a linkage both coils have approximately equal area-turn products, the desired cancellation is obtained.

The principal object and feature of the present invention is the provision of a hum-bucking inductive coupling device having the foregoing characteristics and advantages. Further features and advantages will become apparent from the following detailed description taken in conjunction with the accompanying drawings wherein:

FIG. 1 is a diagram indicating the spatial flux distribution for signals received in the signal coil of the U1 telephone earpiece;

FIG. 2 is a cross section on line 2—2 of FIG. 3 of the hum-bucking coupling coil in accordance with the present invention positioned in the desired relation to the U1 earpiece; and FIG. 3 is a plan view of the arrangement of FIG. 2.

Referring now to the drawings, FIGS. 1, 2 and 3 are vertically aligned relative to the center axis of a U1 telephone earpiece. FIG. 1 shows the flux distribution for signals received by the signal coil in the earpiece. The signals are characterized by a large value flux having a peak on the axis with the flux gradually diminishing symmetrically outward from the axis until at a position somewhat beyond the signal coil in the U1 earpiece the flux reverses direction. This reversed flux represents partially the return path for the main flux which is generated by the signal coil.

FIG. 2 represents in cross section the U1 earpiece comprising a substantially planar multiturn coil 11 which is located within a permeable magnetic core structure 12 having an annular air gap 13. The associated diaphragm 14 and ear coupling member 15 are indicated schematically.

The coupling coil of the present invention comprises a plurality of turns wound into a coil 21 which is substantially planar and form a multiturn loop around the outer diameter of the U1 earpiece. Surrounding the coil 21, is a C-shaped coil indicated generally at 22 which substantially surounds the coil 21 and is coplanar therewith.

Referring to FIG. 3, the structure of the coil 22 can be seen to comprise a C-shaped space 23 which substantially encloses the outer periphery of the coil 21 with the turns of the coil 22 passing along the outer and inner edges of the C-shaped space 23. Thus, the coil 22 is C-shaped and reentrant with the inner turns 24 and the outer turns 25 defining the area 23 as a substantially annular area located at a particular distance from the outer periphery of the U1 earpiece. To assist in winding the coil 22, a C-shaped core of non-permeable material may be used.

The general proportions of the coupling device of the present invention when designed for the U1 earpiece provide an inner area A for the coil 21 which is twice as large as the area 23 indicated in FIG. 3 to have the area A/2. Corresponding to this area distribution, the number of turns in the coil 21 shoud be approximately half the number of turns in the coil 22. Thus, a stray field which links the structure shown in FIG. 3 over a given angular sector would be coupled to the coil 21 with a number of flux linkages which equaled the coupling to the coil 22. The coils 21 and 22 are connected in opposition for such unidirectional fields and at terminals 26 the EMF's induced thereby cancel. Final adjustment of the turns ratio between the two coils is done by optimizing the cancellation with the U1 earpiece in place and uniform, stray, 60 c.p.s. and 120 c.p.s fields applied. For flux having the polarities and distribution indicated in FIG. 1, however, the coil 21 couples substantially the entire positive flux linkage to generate the desired signal and the negative portion of the signal which is located in the vicinity of the space 23 is coupled to coil 22 with reversed polarity. Because of the opposition connection for unidirectional fields, the signals are additive as to terminals 26 whenever the flux distribution is that of FIG. 1 or equivalent.

Various modifications of the present invention will now be apparent to those skilled in the art. In particular, the spatial arangement of a reentrant coil proportioned relative to a principal pick-up coil for the purpose of providing cancellation of unwanted coupling while permitting good coupling to the desired signal field can be made in accordance with the principles of the present invention. The invention accordingly is to be limited only by the scope of the appended claims.

I claim:
1. A hum-bucking induction coupling device for coupling to a substantially planar signal coil comprising
   (a) a first coupling coil in the form of a plurality of turns wound in a substantially planar loop with an inner diameter approximately the size of said signal coil;
   (b) a second coupling coil substantially surrounding and coplanar with said first coupling coil with the turns of said second coupling coil reentrant to form a generally C-shaped coil the enclosed area of which is a C-shaped space, the turns of said C-shaped coil following the outer and inner contour of said C-shaped space; and
   (c) means interconnecting said first and second coils to a pair of terminals in opposition for signals induced by a unidirectional flux linking the turns of both coils.
2. A device according to claim 1 in which said first coupling coil has T turns and an effective area A and said second coupling coil has approximately 2T turns and an effective area $A/2$.
3. Apparatus according to claim 1 in which said inner diameter of said first coupling coil is adapted to fit the periphery of the earpiece of a telephone handset.
4. Apparatus according to claim 3 in which the area of said second coupling coil is positioned to correspond with the region of the return flux path of the direct flux generated by signals in said signal coil so that the direct and return flux are additive in producing induced signal at said terminals.
5. An electromagnetic hum-bucking coupler for a telephone instrument or the like comprising
   (a) means for orienting and holding said telephone instrument in predetermined position;
   (b) a first substantially circular coil held in concentric relation to the magnetic signal field producing element of said instrument;
   (c) a second coil closely surrounding and coplanar with said first coil, said second coil being reentrant to define an annular effective area which substantially surrounds said first coil; and
   (d) connections joining the terminals of said coils to combine in opposition the EMF's induced by unidirectional flux linking both coils.

References Cited
UNITED STATES PATENTS 530,516   12/1894   Field _____ 179—174

KATHLEEN H. CLAFFY, Primary Examiner

A. A. McGILL, Assistant Examiner